(12) United States Patent
Whitfield, Jr. et al.

(10) Patent No.: US 11,703,859 B2
(45) Date of Patent: Jul. 18, 2023

(54) METHOD FOR AUTONOMOUSLY CONTROLLING A VEHICLE

(71) Applicant: LIEBHERR MINING EQUIPMENT NEWPORT NEWS CO., Newport News, VA (US)

(72) Inventors: James Whitfield, Jr., Newport News, VA (US); Jason Altice, Newport News, VA (US)

(73) Assignee: LIEBHERR MINING EQUIPMENT NEWPORT NEWS CO., Newport News, VA (US)

(*) Notice: Subject to any disclaimer, the term of this patent is extended or adjusted under 35 U.S.C. 154(b) by 212 days.

(21) Appl. No.: 16/504,140

(22) Filed: Jul. 5, 2019

(65) Prior Publication Data
US 2021/0004004 A1    Jan. 7, 2021

(51) Int. Cl.
*G05D 1/00*    (2006.01)

(52) U.S. Cl.
CPC ... *G05D 1/0088* (2013.01); *G05D 2201/0202* (2013.01)

(58) Field of Classification Search
CPC .... G05D 1/0088; G05D 1/0094; G05D 1/106; G05D 1/0202; G05D 1/0676; G05D 1/0016; G05D 1/0274; G05D 1/0278; G05D 1/102; G05D 1/0011; G05D 1/0027; G05D 2201/0201; G05D 1/0033; G05D 1/0038; G05D 1/0055; G05D 1/0061; G05D 1/0077; G05D 1/0212; G05D 1/0217; G05D 1/024; G05D 1/0297; G05D 1/042; G05D 1/0646; G05D 1/0808; G05D 1/101; G05D 1/1062; G05D 1/1064; G08G 5/0021; G08G 5/0069; G08G 5/0039; G08G 5/0034; G08G 5/006; G08G 5/0013; G08G 5/0086; G08G 5/045; G08G 5/0052; G08G 5/003; G08G 5/0082; G08G 5/0004; G08G 5/0091; G01C 21/20; G01C 21/00; G01C 21/005;
(Continued)

(56) References Cited

U.S. PATENT DOCUMENTS 6,122,572 A * 9/2000 Yavnai ................ G05D 1/0088
                                                   342/16
6,334,344 B1 * 1/2002 Bonhoure ............. G05D 1/101
                                                   244/190
(Continued)

FOREIGN PATENT DOCUMENTS

WO    2007146616 A2    12/2007
WO    2014148976 A1    9/2014
(Continued)

*Primary Examiner* — Abhishek Vyas
*Assistant Examiner* — Sanjeev Malhotra
(74) *Attorney, Agent, or Firm* — McCoy Russell LLP

(57) ABSTRACT

The present application provides a method for autonomously controlling a vehicle performed by a control system of the vehicle on the basis of a mission received from a mission controller, the method comprising:
  receiving a mission comprising a set of instructions from the mission controller;
  validating the mission by checking whether the mission meets a first set of requirements;
  executing the mission if the mission meets the first set of requirements and
  rejecting the mission if the mission does not meet the first set of requirements.

18 Claims, 10 Drawing Sheets

(58) Field of Classification Search
CPC .. G01C 21/3469; G01C 23/00; G01C 23/005; B64C 39/024; B64C 2201/141; B64C 2201/123; B64C 2201/146; B64C 2201/127; G06T 17/05; G06T 2207/10032; A01B 69/008; A01B 79/005; B62D 15/0265; B64D 2045/0085; B64D 45/08; B64D 47/08; E02F 9/2045; G06F 30/15; G06F 30/20; G06K 9/0063; G06N 7/005; G06Q 50/28

USPC ... 701/2, 3, 4, 15, 16, 25, 31.4, 42, 51, 102, 701/523, 528, 537; 70/11; 342/13; 348/218.1; 340/945; 703/8; 180/218; 706/12

See application file for complete search history.

(56) References Cited

U.S. PATENT DOCUMENTS

| | | | |
|---|---|---|---|
| 7,194,353 B1* | 3/2007 | Baldwin | G08G 5/0039 701/528 |
| 7,337,865 B2 | 3/2008 | Cook et al. | |
| 8,285,425 B2* | 10/2012 | Morales De La Rica | G05D 1/106 701/1 |
| 9,598,843 B2 | 3/2017 | Wei et al. | |
| 10,066,367 B1* | 9/2018 | Wang | E02F 9/265 |
| 2004/0030463 A1* | 2/2004 | Stockdale | G05D 1/0202 701/3 |
| 2006/0106506 A1* | 5/2006 | Nichols | G05D 1/106 701/3 |
| 2008/0133069 A1* | 6/2008 | Morales De La Rica | G05D 1/106 244/175 |
| 2009/0040070 A1* | 2/2009 | Alter | G06T 17/05 340/945 |
| 2009/0079839 A1* | 3/2009 | Fischer | H04N 23/90 348/E5.058 |
| 2010/0071984 A1* | 3/2010 | Doi | B62K 11/007 180/218 |
| 2010/0222958 A1* | 9/2010 | Kobayashi | B62D 6/008 701/31.4 |
| 2011/0106401 A1* | 5/2011 | Kumar | B61L 3/006 701/102 |
| 2011/0130926 A1* | 6/2011 | Lu | B60T 8/171 701/1 |
| 2012/0158220 A1* | 6/2012 | Accardo | G08G 5/0052 701/15 |
| 2013/0046449 A1* | 2/2013 | Yucel | F16H 61/0213 701/99 |
| 2013/0046466 A1* | 2/2013 | Yucel | G01C 21/3469 701/538 |
| 2013/0046526 A1* | 2/2013 | Yucel | G01C 21/3469 703/8 |
| 2013/0080359 A1* | 3/2013 | Will | B60W 40/06 706/12 |
| 2013/0311009 A1* | 11/2013 | McAndrew | B64C 19/00 701/3 |
| 2014/0142785 A1* | 5/2014 | Fuentes | G05D 1/0011 701/2 |
| 2015/0177736 A1* | 6/2015 | Anderson | G05D 1/0242 701/25 |
| 2015/0226575 A1* | 8/2015 | Rambo | G05D 1/0202 701/523 |
| 2015/0253776 A1 | 9/2015 | Tojima et al. | |
| 2016/0078769 A1* | 3/2016 | Coulm | G01C 21/20 701/537 |
| 2016/0086497 A1* | 3/2016 | Williams | G05D 1/0676 701/16 |
| 2016/0107620 A1 | 4/2016 | Humphrey | |
| 2016/0117936 A1* | 4/2016 | Klinger | G08G 5/0021 701/3 |
| 2016/0224029 A1 | 8/2016 | Tojima et al. | |
| 2016/0347470 A1* | 12/2016 | Swearingen | B60R 16/0232 |
| 2017/0017235 A1 | 1/2017 | Tanaka et al. | |
| 2017/0192431 A1* | 7/2017 | Foster | G05D 1/0217 |
| 2017/0269611 A1* | 9/2017 | Rangarajan | G05D 1/0055 |
| 2017/0285631 A1* | 10/2017 | Bethke | G05D 1/0061 |
| 2017/0285658 A1 | 10/2017 | Sakai et al. | |
| 2017/0374190 A1* | 12/2017 | Dowlatkhah | H04M 1/72415 |
| 2018/0114449 A1* | 4/2018 | Kohn-Rich | G08G 5/0047 |
| 2018/0218533 A1* | 8/2018 | Millin | G06T 17/05 |
| 2018/0261101 A1* | 9/2018 | Hardt | G08G 5/0017 |
| 2018/0265195 A1* | 9/2018 | Knapp | G06Q 50/18 |
| 2018/0275654 A1* | 9/2018 | Merz | G05D 1/0033 |
| 2019/0005184 A1* | 1/2019 | Courtin | G06F 30/15 |
| 2019/0054937 A1* | 2/2019 | Graetz | B61L 23/047 |
| 2019/0079509 A1* | 3/2019 | Bosworth | G05D 1/0094 |
| 2019/0086506 A1* | 3/2019 | Steinhour | G01S 11/04 |
| 2019/0118946 A1* | 4/2019 | Winn | B64C 39/024 |
| 2019/0129435 A1* | 5/2019 | Madsen | G05D 1/0212 |
| 2019/0235532 A1* | 8/2019 | Paduano | G06Q 50/265 |
| 2019/0277637 A1* | 9/2019 | Ghaemi | G01C 21/20 |
| 2019/0295425 A1* | 9/2019 | Grimald | G08G 5/0013 |
| 2019/0355266 A1* | 11/2019 | Cross | G01S 13/953 |
| 2020/0103552 A1* | 4/2020 | Phelan | G01S 13/95 |
| 2020/0133260 A1* | 4/2020 | Chambers | B64C 39/024 |
| 2020/0166956 A1* | 5/2020 | Stoschek | G01S 7/4802 |
| 2020/0369384 A1* | 11/2020 | Kelly | G05D 1/101 |

FOREIGN PATENT DOCUMENTS

| | | |
|---|---|---|
| WO | 2015037442 A1 | 3/2015 |
| WO | 2015076733 A1 | 5/2015 |
| WO | 2015187081 A1 | 12/2015 |
| WO | 2016046979 A1 | 3/2016 |
| WO | 2016047208 A1 | 3/2016 |
| WO | 2017184068 A1 | 10/2017 |

* cited by examiner

METHOD FOR AUTONOMOUSLY CONTROLLING A VEHICLE

FIELD OF THE INVENTION

The present application relates to a method for autonomously controlling a vehicle performed by a control system of the vehicle on the basis of a mission received from a mission controller. Further, the present application relates to a control system of a vehicle for autonomously controlling a vehicle.

In the context of the present application, a mission may in particular comprise a set of instructions for an autonomous vehicle that provide at least one out of spatial trajectory, speed references, ancillary commands, and other attributes as required to perform automated haulage.

BACKGROUND ART

In conventional systems, error checking of missions is done at a central control system level, i.e. before the mission are sent to the vehicle for execution.

The problem is that the autonomous vehicle could receive a mission from a centralized control system that is corrupt, incorrect, in error, or malicious. Said errors could result in loss of control of the vehicle, have the vehicle operate outside of its design parameters, enter an area that is unauthorized, or execute unexpected behavior such as a U-turn (because the mission is opposite to the current heading) or chase a start point far away that are non-traversable.

BRIEF SUMMARY OF THE INVENTION

An object of the present invention is to provide a method of controlling a vehicle that has reduced dependency on a centralized control system.

These and other objects may be solved by embodiments of the present disclosure.

In one aspect, a concept of at least one out of pre-validating and real-time validating a mission with pass criteria on-board on the vehicle side is provided. The approach is therefore agnostic to central platforms and does not depend on a centralized control system for checking the mission.

In a first embodiment, a method for autonomously controlling a vehicle performed by a control system of the vehicle on the basis of a mission received from a mission controller is provided, the method comprising:
  receiving a mission comprising a set of instructions from the mission controller;
  validating the mission by checking whether the mission meets a first set of requirements;
  executing the mission if the mission meets the first set of requirements and
  rejecting the mission if the mission does not meet the first set of requirements.

In a second embodiment, a method for autonomously controlling a vehicle performed by a control system of the vehicle on the basis of a mission received from a mission controller is provided, the method comprising:
  receiving a mission comprising a set of instructions from the mission controller;
  validating the mission before it is executed by checking whether the mission meets a first set of requirements; during execution of the mission, validating in real time whether the mission or a segment of the mission meets a second set of requirements.

In a third embodiment, a control system for autonomously controlling a vehicle on the basis of a mission received from a mission controller is provided, the control system being configured for performing a method comprising the steps of:
  receiving a mission comprising a set of instructions from the mission controller;
  validating the mission by checking whether the mission meets a first set of requirements;
  executing the mission if the mission meets the first set of requirements and
  rejecting the mission if the mission does not meet the first set of requirements.

DETAILED DESCRIPTION OF THE INVENTION

Figure 1:
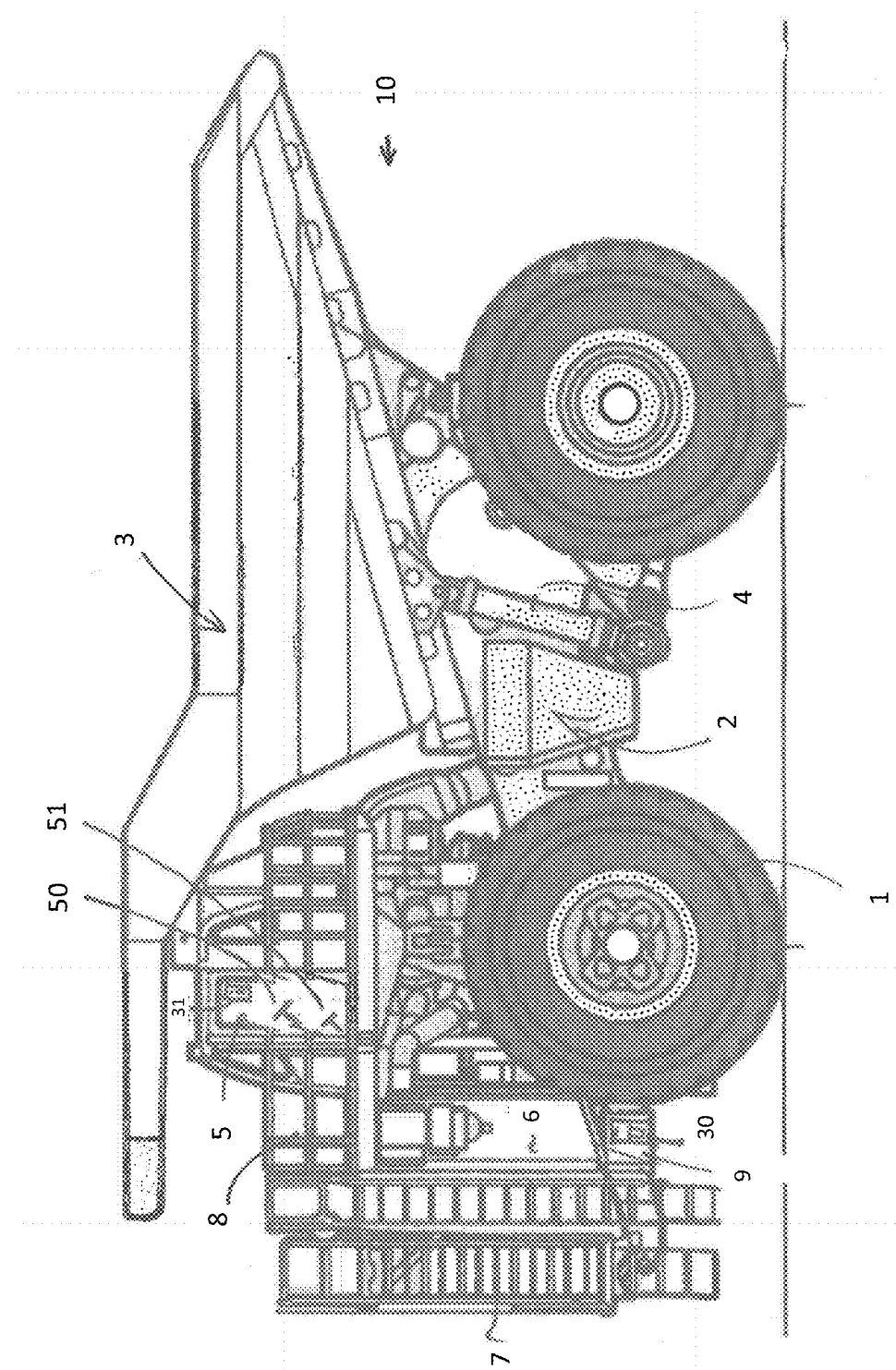
FIG. 1 is a side view of a an embodiment of a vehicle.

FIG. 1 shows a dumper truck as used in mines for transport purposes as an exemplary embodiment of a vehicle. The dumper truck may have a payload of 100 metric tons or more. Concepts of the present disclosure can equally be applied to other types of vehicles.

The dumper truck 30 comprises a chassis 2 that is movable on wheels 1. The wheels 1 are driven by a drive unit 6 comprising at least one engine. The engine may be an internal combustion engine, e.g. a diesel engine. In an embodiment, the drive unit 6 may be a diesel-electric drive unit. The wheels may be driven by electric motors powered by a generator, the generator in turn driven by the diesel engine.

The dumper truck shown in FIG. 1 comprises a dump body 3 mounted on the chassis 2. The dump body is attached to the chassis with a horizontal pivot axis, and can be swiveled up by hoist cylinders 4 in order to let material contained in the dump body slide out of the dump body to the rear side of the dumper truck.

As shown in FIG. 1, in an embodiment, the vehicle may comprise a cabin 5 for a driver, in order to additionally allow manual operation of the vehicle. The cabin may be provided with input elements for controlling the vehicle in the manual mode. For example, a steering wheel 50 and an accelerator pedal 52 may be provided in the cabin for controlling a steering angle and a speed of the vehicle. In other embodiments, no cabin is provided.

As shown in FIG. 1, in an embodiment, the vehicle may comprise stairs 7 for climbing up to the cabin. In the embodiment, the cabin 5 is provided on a platform 8 accessible via the stairs 7.

Figure 2:
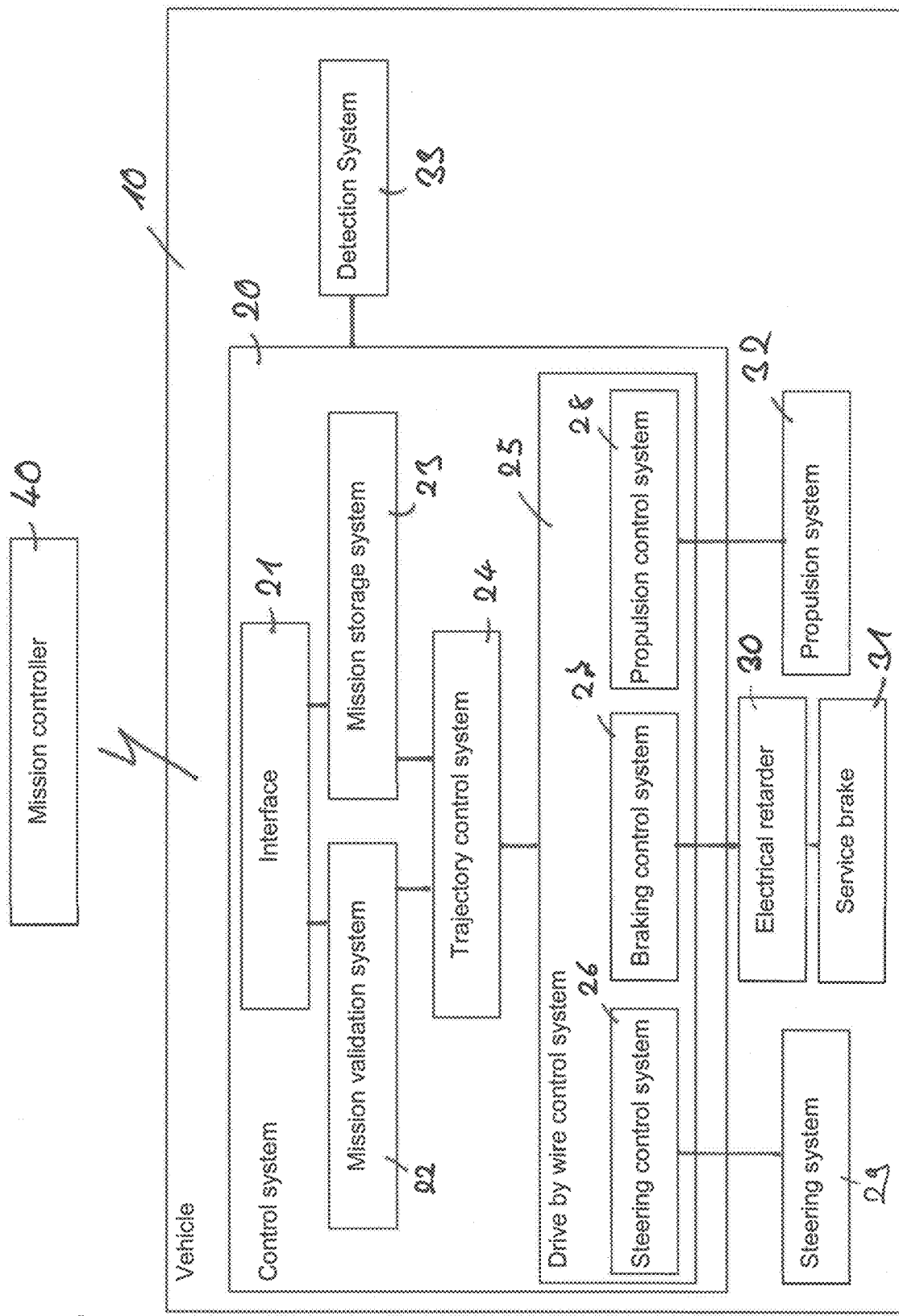
FIG. 2 is a schematic drawing showing functional components of an embodiment of a vehicle control system and a vehicle.

Functional components of an embodiment of a control system 20 of the vehicle 10 and a vehicle are shown in FIG. 2.

The control system 20 is configured to autonomously operate the vehicle 10. The control system may autonomously move the vehicle from a start position to an end position according to a mission received from a mission controller 40. The mission may define a trajectory of the vehicle. The control system 20 may identify the current position of the vehicle using a detection system 33 and may autonomously control the vehicle along the trajectory.

The control system 20 may comprise a microcontroller running a software for controlling the vehicle. The software may be stored on non-transitory memory.

The vehicle control system may comprise a drive by wire control system 25. The drive by wire control system 25 may comprise a braking control system 27 controlling a braking system of the vehicle, a steering control system 26 controlling a steering system 29 of the vehicle and a propulsion control system 28 controlling the propulsion system 32 of the vehicle.

The braking system may comprise an electrical retarder 30 and a service brake 31. The electric retarder 30 may operate by controlling the electric drive motors of the vehicle to provide a braking torque to the wheels. The electric drive motors thereby generate electrical energy, which may be dissipated as heat by a resistor system, or may be recovered by an energy storage system. The service brake may be a friction brake, such as a disk brake.

The control system 20 may further comprise a trajectory control system 24. The trajectory control system may receive a mission and generate a trajectory of the vehicle. Based on the trajectory, the trajectory control system 24 may issue commands to the drive by wire control system 25 for guiding the vehicle along the trajectory.

The vehicle control system 20 may remotely communicate with a mission controller 40 of a traffic management system via interface 21. The interface may be a radio communication interface.

The vehicle control system 20 may comprise a mission storage system 23 and a mission validation system 22.

The vehicle may be configured to receive missions via an open protocol from the mission controller 40 of a centralized control system. A mission may be a means to provide an autonomous machine a set of road segments with attributes (e.g. target speed, grade, curvature) that define where the central control system wants the autonomous machine to go and operations that it may perform. The central control system may be a mine site traffic management system remotely communicating with the vehicle control system 20.

The mission validation system 22 may be configured to validate a mission received from the central control system.

The mission validation system 22 may be configured to avoid that the vehicle attempts to embark on a mission that could lead to loss of control of the vehicle and/or the vehicle travelling on unauthorized surfaces/roadways. The concept of mission validation may involve a static validation (e.g. a pre-check of a mission before the start of execution) as well as real-time validation.

Figure 3A:
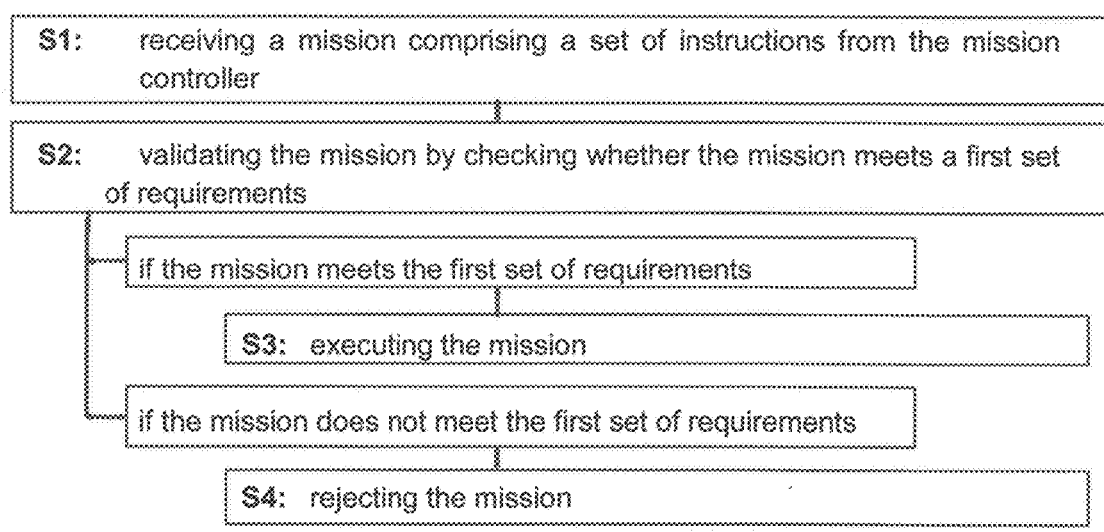
FIG. 3A is a schematic drawing showing steps of a first embodiment of a method for autonomously controlling a vehicle.

FIG. 3A shows a first embodiment of a method for autonomously controlling a vehicle performed by the control system 20 of the vehicle 10 on the basis of a mission received from the mission controller 40. The method may comprise the following steps:

Step S1 may comprise receiving a mission comprising a set of instructions from the mission controller.

Step S2 may comprise validating the mission by checking whether the mission meets a first set of requirements.

If the validation step confirms that the mission meets the first set of requirements, the method proceeds to step S3. In step S3, the control system 20 executes the mission.

If the validation step shows that the mission does not meet the first set of requirements, the method proceeds to step S4. In step S4, the control system 20 rejects the mission.

Execution and rejection of a mission may be communicated from the control system 20 to the mission controller 40 via interface 21.

In an embodiment, the method may comprise the further steps of storing a mission received from the mission controller; receiving a command from the mission controller to execute the mission; and, on receipt of the command to execute the mission, performing the step of validating the mission.

In an embodiment, the method may comprise the further steps of determining a current value of at least one dynamic variable, the dynamic variable describing at least one out of a vehicle parameter and an environmental parameter; and performing the step of validating the mission using the current value of the at least one dynamic variable.

The at least one the dynamic variable may describe at least one out of a weight of the vehicle, a loading condition, a weather condition and a road condition.

Figure 3B:
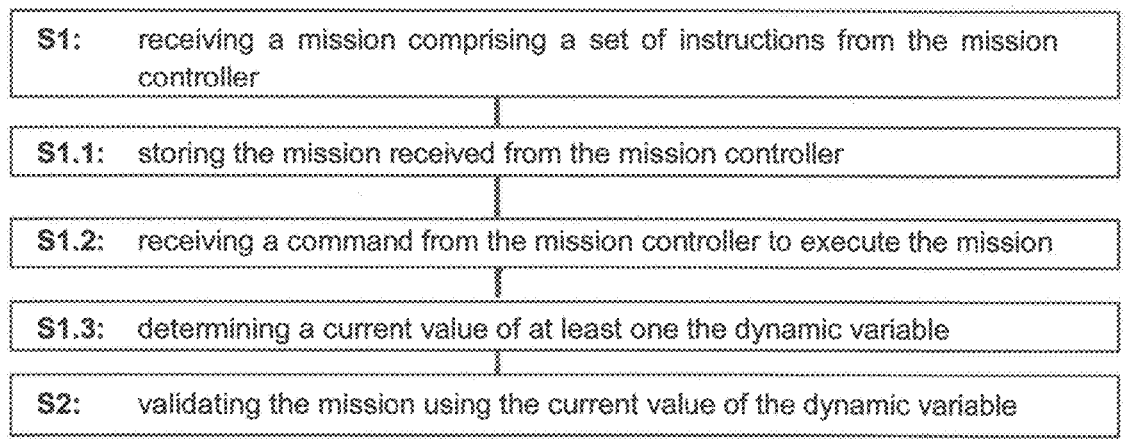
FIG. 3B is a schematic drawing showing steps of a second embodiment of a method for autonomously controlling a vehicle.

FIG. 3B shows a second embodiment of a method for autonomously controlling a vehicle performed by the control system 20 of the vehicle 10 on the basis of a mission received from the mission controller 40. The method may comprise the following steps:

Step S1 may comprise receiving a mission comprising a set of instructions from the mission controller.

Step S1.1 may comprise storing the mission received from the mission controller. In an embodiment, step S1.1 may comprise storing a plurality of missions.

Step S1.2 may comprise receiving a command from the mission controller to execute the mission.

On receipt of the command to execute the mission, the method may proceed by performing the following sub-steps:

Step S1.3 may comprise determining a current value of at least one the dynamic variable, the dynamic variable describing at least one out of a vehicle parameter and an environmental parameter.

Step S2 may comprise performing the step of validating the mission using the current value of the dynamic variable.

As indicated above, step S2 may comprise validating the mission by checking whether the mission meets a first set of requirements.

The method shown in FIG. 3B may then proceed with steps S3 or S4 of the method described with respect to FIG. 3A.

Mission validation may comprise validation of lateral vehicle stability.

In an embodiment, the step of validating the mission may comprise the sub-step of validating a lateral vehicle stability during the mission by validating a turning radius and a vehicle velocity in dependence on a weight of the vehicle.

In an embodiment, the vehicle may comprise an electric retarder and at least one service brake, and the step of validating the mission may comprise the sub-step of validating whether the mission can be executed using only the electric retarder.

In an embodiment, mission validation may be performed against a 3D terrain map. The 3D terrain map may provide a slope of the terrain for validation of a retarding envelope. Traversable areas may be marked on the map for validity check.

In an embodiment, the method may comprise the further step of storing a 3D terrain map, wherein the validating step may be performed using the 3D terrain map.

Mission validation may comprise validation of a retarding envelope. The retarder 30 may have a fixed power, and therefore may provide less tractive effort with higher speeds. The mission may therefore be validated for staying within the retarding envelope, i.e. requiring only braking that can be provided by the retarder. This may be validated for going downhill, where the retarder may absorb power in order to keep the truck from accelerating.

In an embodiment, the method may comprise the further steps of determining a terrain slope from the 3D terrain map and of validating whether the vehicle stays within an operating envelope based on a vehicle weight and the terrain slope.

In an embodiment, the operating envelope may be a retarding envelope describing a maximum downhill speed allowed by a retarder of the vehicle, the maximum downhill speed depending on the terrain slope and the vehicle weight.

In an embodiment, the operating envelope may be a gradeability envelope describing a maximum uphill speed of the vehicle, the maximum uphill speed depending on the terrain slope and the vehicle weight.

In an embodiment, the operating envelope may be a lateral vehicle stability envelope describing a turning radius and a vehicle velocity in dependence on the terrain slope and a weight of the vehicle.

In an embodiment, the step of validating the mission may comprise validating whether the vehicle stays within any combination of the operating envelopes discussed above.

In an embodiment, traversable areas may be marked on the 3D terrain map, and the method may comprise the step of validating whether the mission stays within the traversable areas.

In an embodiment, the mission may comprise a plurality of segments, each segment comprising a segment distance and a reference speed, wherein the step of validating the mission may comprise the sub-steps of validating for each segment whether a reference speed is within a capability of the vehicle with respect to a segment distance; and, if the speed is outside the capability of the vehicle, adapting the reference speed of the segment or a reference speed of a neighboring segment.

In an embodiment, the step of validating the mission comprises the sub-step of
validating whether a beginning of a route of the mission is within a defined area with respect to a current position of the vehicle.

In an embodiment, the step of validating the mission may comprise at least one out of the following sub-steps:
validating whether latitudes and longitudes included in the mission are all within an inner boundary value;
validating whether speed commands included in the mission are all less than or equal to a maximum vehicle speed value;
validating whether all segments of the mission have been received and are continuous;
validating whether a radius for curves included in the mission is not too small for a turning radius of the vehicle;
validating that no mission segment crosses a vertical or near vertical altitude change;
validating whether all segments have valid latitude, longitude, and altitudes;
validating whether the mission respects reverse speed limits In an embodiment, the method may comprise an additional step of validating during execution of the mission in real time whether the mission or a segment of the mission meets a second set of requirements.

In an embodiment, the method may comprise the further step of, during execution of the mission, adapting at least one out of speed and curvature such that the vehicle stays within an operating envelope depending on a vehicle weight, the operating envelope being at least one out of a gradeability envelope, a retarding envelope and a lateral stability envelope.

Figure 4:
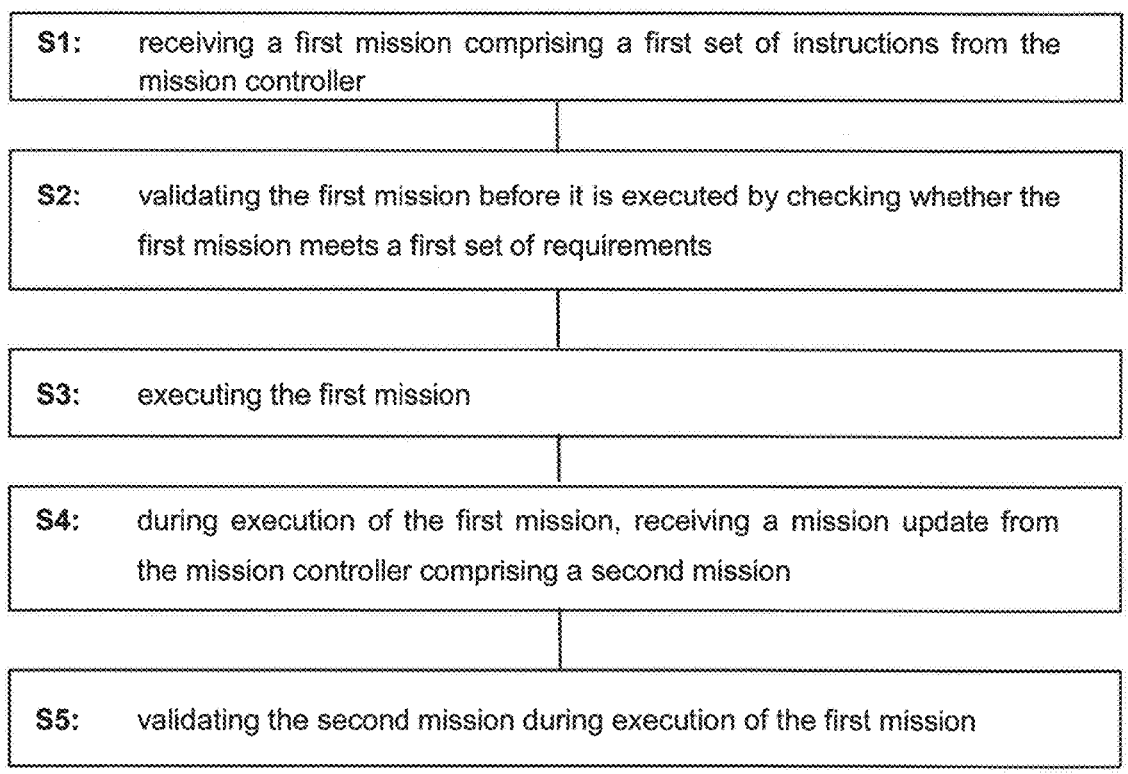
FIG. 4 is a schematic drawing showing steps of a second embodiment of a method for autonomously controlling a vehicle.

A third embodiment of a method for autonomously controlling a vehicle 10 performed by a control system 20 of the vehicle on the basis of a mission received from a mission controller 40 will now be described with respect to FIG. 4.

In an embodiment, the method may comprise the following steps:

Step S1 may comprise receiving a first mission comprising a set of instructions from the mission controller.

Step S2 may comprise validating the first mission before it is executed by checking whether the first mission meets a first set of requirements.

Step S3 may comprise executing the first mission.

Step S4 may comprise receiving a mission update from the mission controller comprising a second mission during execution of the first mission.

Step S5 may comprise validating the second mission during execution of the first mission.

In an embodiment, the method may comprise the further step of stopping execution of the first mission and starting execution of the second mission if the second mission passes validation.

In an embodiment, the method may comprise the further step of aborting the first mission and stopping the vehicle if the second mission is rejected during validation.

In an embodiment, the second mission may be validated with respect to a current pose of the vehicle, the pose comprising a current position, heading and speed of the vehicle.

In an embodiment, mission validation may be provided at multiple levels within the architecture. For example, the mission validation system 22 may check the mission before it is executed; and the trajectory control system 24 checks the mission while it is executed.

The method according to the third embodiment may be combined with any of the aspects described with respect to the first and second embodiment.

In an embodiment of a control system 20 for autonomously controlling a vehicle 10 on the basis of a mission received from a mission controller 40, the control system may be configured for performing a method comprising the steps of:

- receiving a mission comprising a set of instructions from the mission controller; this step may be performed by interface 21;
- validating the mission by checking whether the mission meets a first set of requirements; this step may be performed by the mission validation system 22;
- executing the mission if the mission meets the first set of requirements; this step may be performed by trajectory control system 24 and drive by wire control system 25; and
- rejecting the mission if the mission does not meet the first set of requirements; this step may be performed by mission validation system 22 and interface 21.

In an embodiment, the control system may comprise a mission storage system 23 for storing a plurality of missions received from a mission controller 40, the control system being configured for:

- receiving a command from the mission controller to execute the mission; this step may be performed by interface 21; and
- on receipt of the command to execute the mission, performing the following sub-steps:
- determining a current value of at least one the dynamic variable, the dynamic variable describing at least one out of a vehicle parameter and an environmental parameter; this sub-step may be performed by the mission validation system 22; and
- performing the step of validating the mission using the current value of the dynamic variable; this sub-step may be performed by the mission validation system 22.

In an embodiment, the control system may be configured for validating in real time whether the mission or a segment of the mission meets a second set of requirements during execution of the mission. This step may be performed by the trajectory control system 24.

The control system may be further configured as described above and may be configured to execute any of the method steps described above with respect to the first to third embodiment of a method.

Further features of embodiments of a method and a control system are described in the following:

Pre-validating a mission may be performed by checking at least one, a plurality of or all of the following pass criteria:
1. The location of the mission segments are contained within the inner authorized boundary.
2. The location of the mission segments do not exceed the gradeability of the machine as referenced to the traversable area map (surface baseline terrain map)
3. The location of the mission segments do not exceed a combination of grade and speed that would exceed the electric retarding capability of the machine. This is to ensure the machine is operated within the retarding envelope (e.g. performance curve)
4. The speed of the mission segments are all less than or equal to the max vehicle speed
5. The mission is complete and all segments have been received and are continuous (no discontinuities for example start and end points of consecutive segments must match)
6. The radius for curves are not too small for the vehicle
7. The start point of the mission is in front of the vehicle and in close 3D proximity (altitude included) to eliminate the truck "finding" the start point on its own and preventing the truck from erroneous behavior such as a U-turn to start the mission.
8. Adjusting the segments speed if the desired mission speed is outside of the vehicle's capability. Example: a very short final segment with slow speed with a previous segment of high speed that would result in violation of the next segment
9. The mission respects reverse speed limits
10. The mission respects lateral stability envelope as defined by the combination of GVW (Gross Vehicle Weight), speed, and curvature.
11. The mission segments are all on traversable "roads"
12. No mission segment crosses a vertical or near vertical altitude change (e.g. Cliff)
13. All segments have valid latitude, longitude, and altitudes In addition to static mission validation, the control system of the autonomous vehicle may ensure in real-time at least one, a plurality of or all of the following when the machine is in motion:
1. Adherence to the operational limits of the machine with respect to gradeability.
2. Adherence to the retarding envelope of the machine by regulating speed such that the capacity of the electric retarder is not exceeded.
3. Adherence to the lateral stability envelope by adjusting speed and/or curvature to respect the lateral stability envelope.
4. Mission updates must consider the present pose of the vehicle with sufficient accuracy to be accepted; else the machine will stop. Example: A machine is in motion and a replacement mission is desired. The replacement mission must consider the vehicle speed and "time" the start point such that the location of the replacement mission is within tolerance to achieve a smooth transition from mission to mission without stoppage.

In an embodiment, mission validation may proceed as follows:

A plurality of missions may be received from the mission controller 40 and stored in a buffer of the mission storage system 23. Every mission may be identified by a mission ID.

If a mission command request is "Run" and the mission ID of the command matches an existing mission ID in the mission storage system, a mission handler of the mission validation system may ensure that the mission meets all of the following sub requirements. Mission validation may be performed every time the vehicle is commanded to run a mission. This is because the mission validation may check for dynamic variables and can give different results for different situations.

A sub requirement may be that the entire mission is on a traversable surface defined by the surface baseline terrain map.

Figure 7:
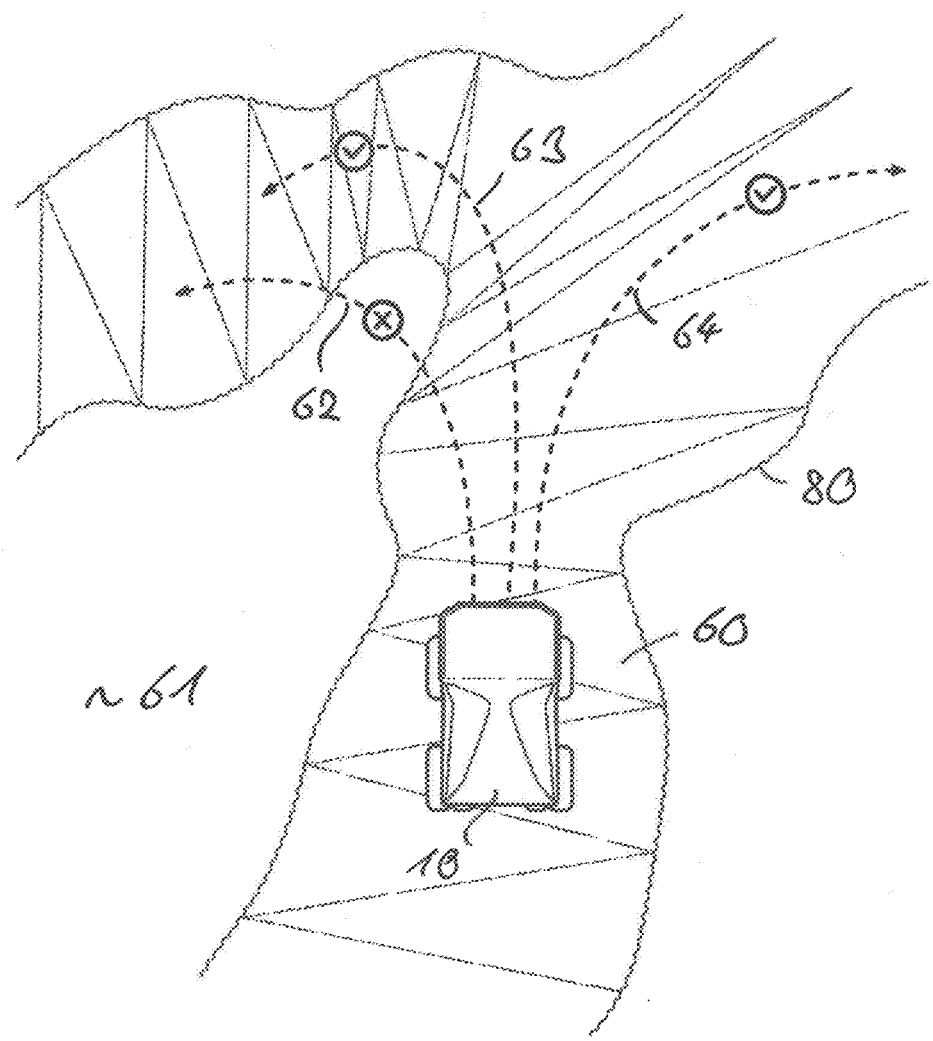
FIG. 7 is a schematic drawing showing an embodiment of a first sub-step of validating a mission.

FIG. 7 shows an example of this validation sub-step. In the 3D terrain map, a traversable surface area 60 is defined. The traversable surface area 60 is has a boundary 80 with respect to an non-traversable surface area 61.

The validation sub-step checks whether all the segments of a mission are within the traversable surface area 60. Mission 62 is partially outside the traversable surface area 60 and is therefore rejected. Missions 63 and 64 are entirely contained within the traversable surface area 60 and therefore pass this validation sub-step.

A sub requirement may be that a beginning of route defined by the mission is in front of the vehicle within a defined turning radius and less than a configurable number of meters away. A further sub requirement may be that the mission provides a continuous trajectory.

Figure 8:
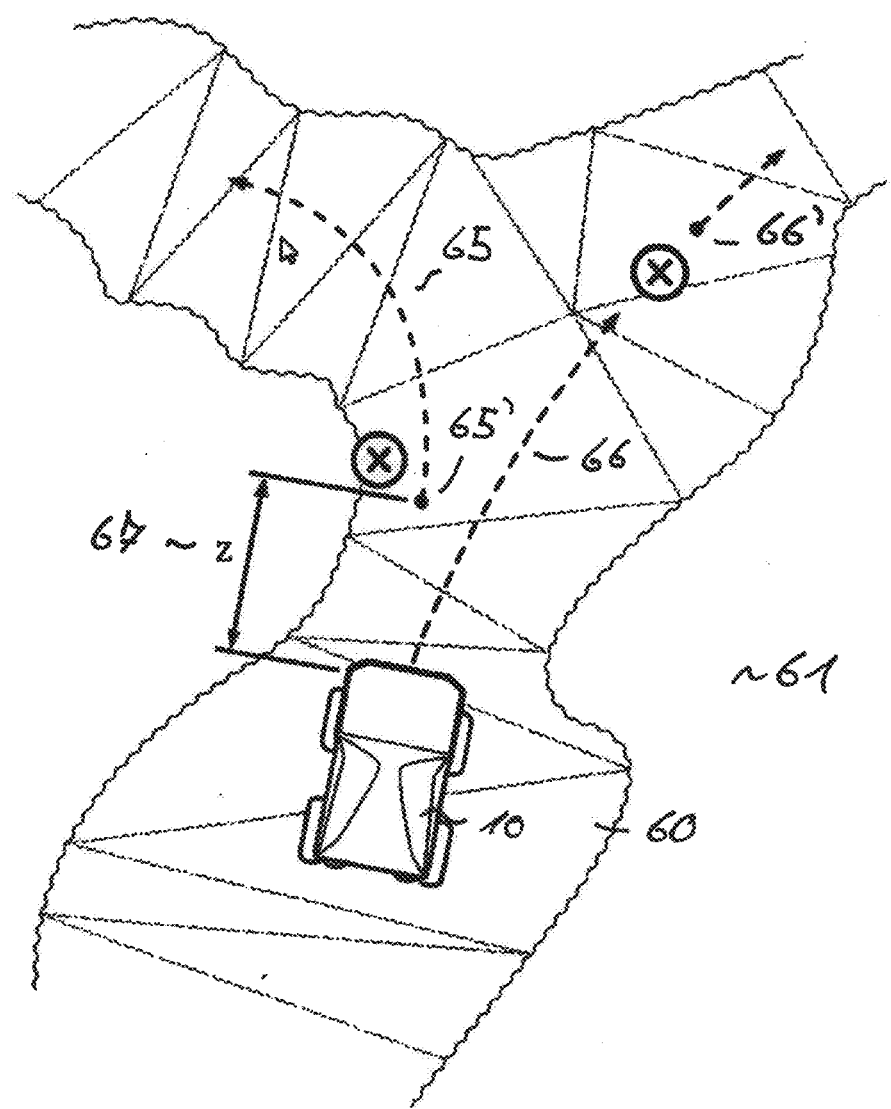
FIG. 8 is a schematic drawing showing an embodiment of a second sub-step of validating a mission.

FIG. 8 shows examples of these validation sub-steps. As an illustration of the first sub-step, a distance 67 between a starting point 65' of a first mission 65 and the vehicle 10 is determined in the 3D terrain map and compared with a threshold. In FIG. 8, the first mission 65 is rejected because the distance is bigger than the threshold. As an illustration of the second sub-step, the second mission 66 is checked with respect to the requirement to provide a continuous spatial trajectory and rejected because it has discontinuous segments at 66', i.e. the end point of a segment and the starting point of the next segment do not match.

A further sub requirement may be that the entire mission stays within the vehicle's operating envelope in regards to vehicle weight, load, and terrain slopes.

Figure 6:
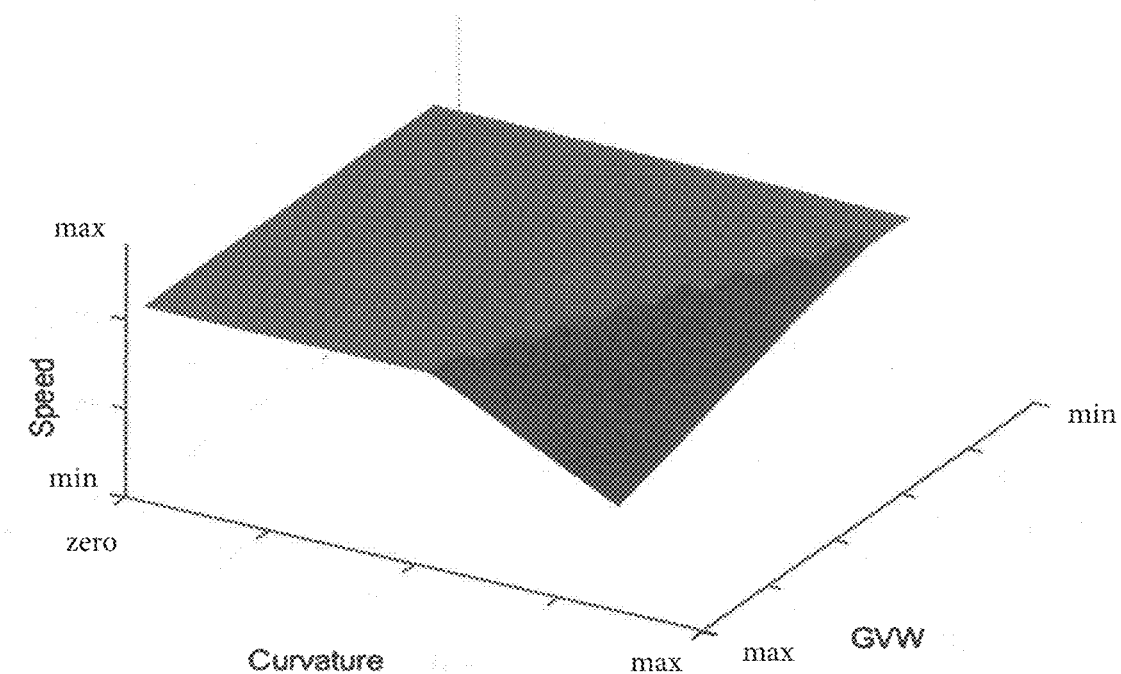
FIG. 6 is a schematic drawing showing an embodiment of a second operating envelope used in a step of validating a mission.
Figure 9:
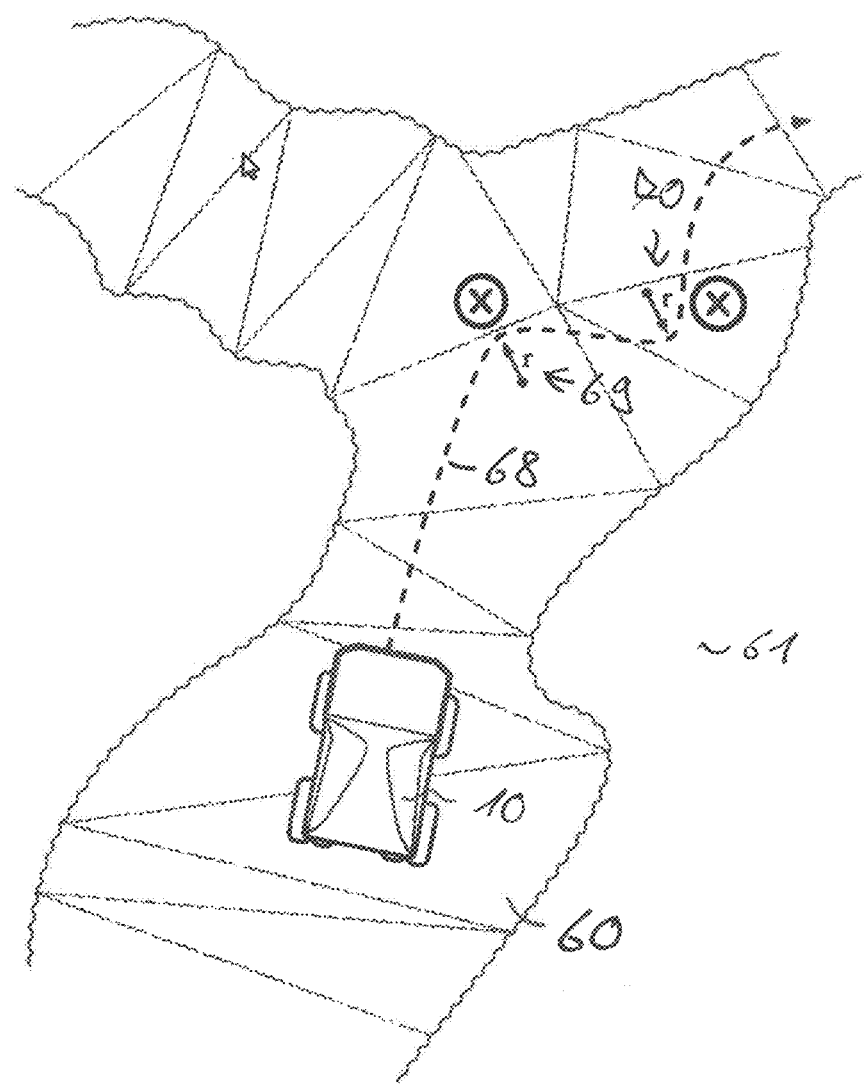
FIG. 9 is a schematic drawing showing an embodiment of a third sub-step of validating a mission.

FIG. 9 shows an embodiment of such a sub-step validating the mission with respect to a lateral stability envelope. An example of such a lateral stability envelope is shown in FIG. 6. It defines a maximum speed and curvature combination depending on GVW. All segments are validated to stay within the lateral stability envelope. In FIG. 9, the mission 68 is rejected because it contains two segments 69 and 70 requiring a speed and curvature that would violate the lateral stability envelope. The lateral stability envelope may further take into account a slope of the terrain.

A further sub requirement may be that the entire mission respects vehicle limitations such as a minimum turning radius of the vehicle. This check may be performed in the same way as shown in FIG. 9, by checking that no segment requires a turning radius that is below the fixed minimum turning radius, in addition or to the variable minimum turning radius defined by the lateral stability envelope of the vehicle.

Figure 5:
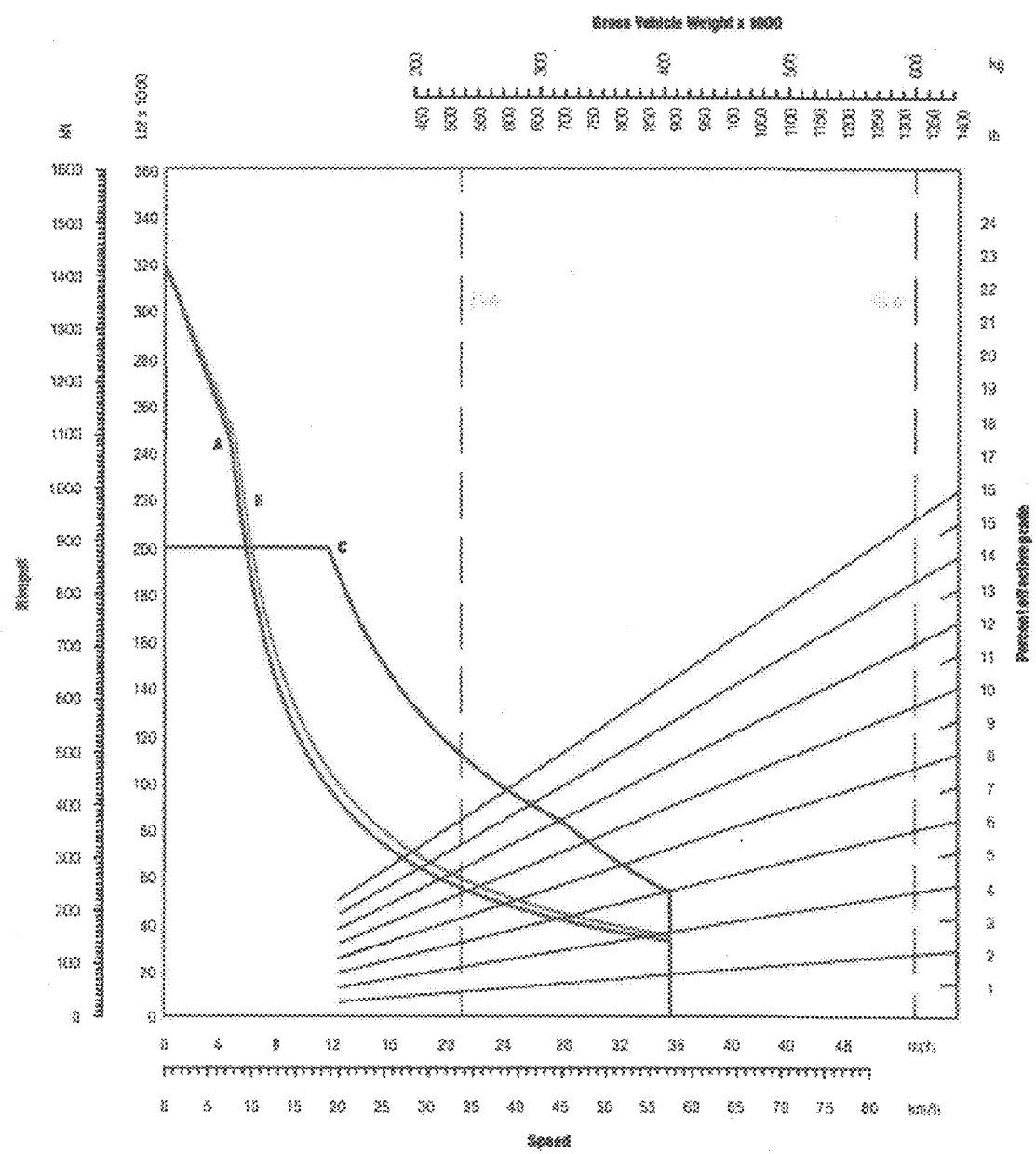
FIG. 5 is a schematic drawing showing an embodiment of a first operating envelope used in a step of validating a mission.
Figure 10:
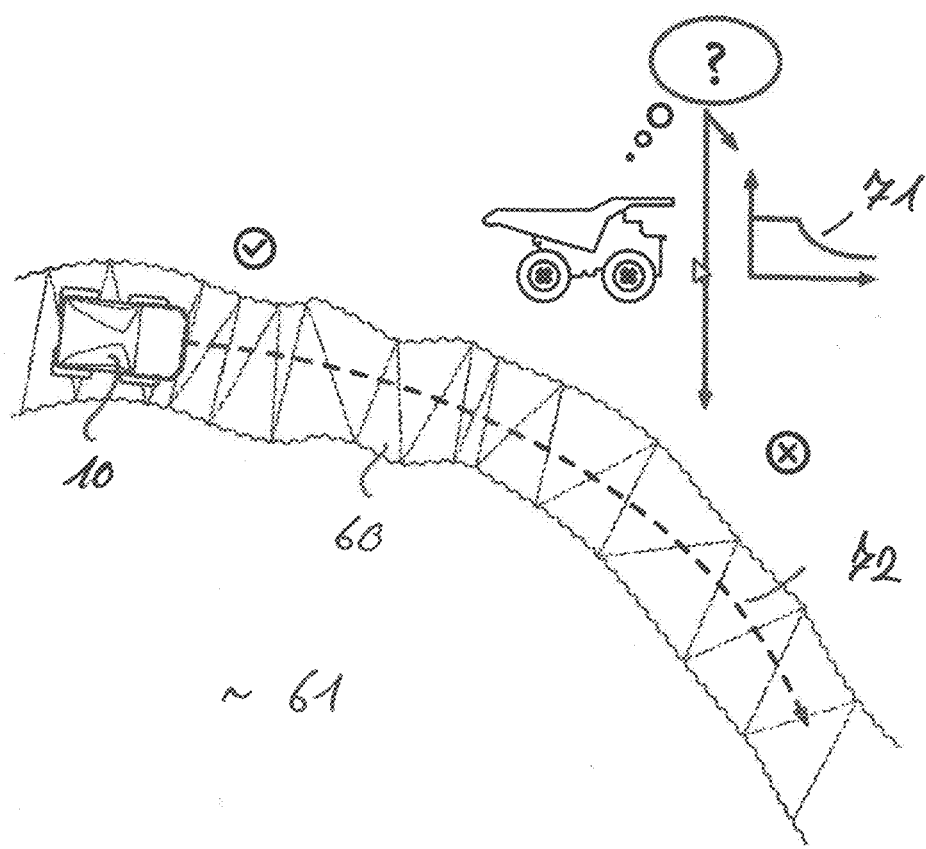
FIG. 10 is a schematic drawing showing an embodiment of a fourth sub-step of validating a mission.

FIG. 10 shows an embodiment of such a sub-step validating the mission with respect to a gradeability envelope and a retarding envelope. The gradeability envelope may be defined by a rimpull curve as shown in FIG. 5, and shows the maximum uphill speed and grade combination in dependence on GVW. A retarding envelope may describe the maximum downhill speed and grade combination in dependence on GVW. In FIG. 10, the downhill route defined by mission 72 is rejected because it is outside the retarding envelope 71.

Further sub-requirement may be:
- The latitudes and longitudes are all within the inner boundary (inner boundary configuration value).
- The speed commands are all less than or equal to the max vehicle speed value (Max Speed configuration value)
- Mission is "complete" meaning all segments have been received
- Radius for curves are not too small for vehicle's turning radius
- Validate the reference speed vs segment distance for every segment to ensure the prescribed speed/distance is within the machine capability. If the speed is outside the vehicle's capability to reach within the segment distance then the mission handler will enable fault "Speed Modified" and the mission handler will adjust the segment's speed.
- Validate the reference speed vs segment distance with respect to requirements of other, neighboring segments to ensure the prescribed speed/distance is within the machine capability. For example, if there is a very short final segment and the previous segment has a high desired speed, the truck may not be able to stop within the distance of the final segment. This may in particular be the case if the truck is loaded and therefore has a large braking distance. In such a case, the mission is not rejected by the mission handler, but the desired speed of the previous segment is reduced by the mission handler to guarantee a safe stop during the final segment.

If any of the mission validation conditions fail, except for "Speed Modified", then the mission command response will have the response code set to "mission validation rejected".

If all of the mission validation conditions pass, then the mission handler will send the mission command request to the trajectory control system 24.

During execution of the mission, the trajectory control system 24 performs a number of real-time validation steps for controlling the vehicle via the control system 25.

The trajectory control system 24 will issue a desired Reference Velocity. The trajectory control system 24 may plan velocity profiles within a configurable rimpull curve for the vehicle. An embodiment of a rimpull curve is shown in FIG. 5.

In normal operation, the trajectory control system 24 may never issue a reference velocity which will require the (Drive By Wire) control system 25 to use the service brakes 31. In addition, the trajectory control system 24 may plan a velocity profile to account for changing haul road grades, such that reference velocity is reduced prior to entering a steeper section of haul road. Desired acceleration and deceleration parameters for limits are stored in the trajectory control system 24 as reference velocity changes.

The trajectory control system 24 will receive low fidelity velocity targets from the mission controller 40 of the Traffic Management System via the interface 21. This information may be used by the trajectory control system 24 to calculate a high fidelity velocity profile for the current path plan. The trajectory control system 24 may issue velocity commands to the control system 25 to achieve forward or backwards movement, designated by a velocity magnitude and a direction indication, of the autonomously controlled vehicle.

Each autonomously controlled vehicle will differ in its total available power output based on many factors including weather, truck mechanical condition, underfoot condition, etc. When climbing a hill loaded, the trajectory control system 24 may handle this by always commanding a velocity greater, by a configurable value, than the truck is traveling. This will allow the control system 25 to continuously issue a full power request from the truck drive system 32.

The trajectory control system 24 may calculate appropriate acceleration and de-acceleration rates when issuing velocity requests in order to avoid unnecessary service brake 31 utilization and/or aggressive maneuvers.

The trajectory control system 24 may issue desired curvature to the control system 25 in order to maintain or change the path curvature in order to implement its mission. The control system 25 will attempt to achieve the desired curvature command by closed loop control of steered wheel angle (theoretical curvature). The control system 25 will provide continual feedback on the estimated curvature to the trajectory control system 24.

The trajectory control system 24 may determine if a slip and/or slide situation is occurring by comparing the actual curvature of autonomously controlled vehicle with the estimated curvature reported by the control system 25. The trajectory control system 24 may then react accordingly by recalculating the high fidelity path plan based on the deviation due to the slip and request subsequent commands that may include reduced velocity and/or increased curvature.

The trajectory control system 24 may validate segments upon receipt, and reject any segments that exceed operational limits Invalid missions may be announced via the segment response message. Any segments in the queue may continue to be navigated if currently under execution.

The trajectory control system 24 may continuously calculate the maximum allowable speed that can be achieved by the autonomously controlled vehicle within its retarding envelope while in forward motion. The trajectory control system may not command a desired speed that would place the autonomously controlled vehicle outside the retarding envelope under any circumstances unless operating under obstacle avoidance.

The trajectory control system 24 may not command a speed that exceeds its configured maximum speed for the following conditions:
 i. Forward Motion Empty
 ii. Forward Motion Loaded
 iii. Reverse Motion Empty
 iv. Reverse Motion Loaded when down grade does not exceed the configured max allowable down grade in reverse The trajectory control system 24 may not command Reverse Motion of the autonomously controlled vehicle when down grade exceeds the configured max allowable down grade in reverse under any circumstances.

The trajectory control system 24 may not command a speed/curvature combination that would cause the autonomously controlled vehicle to lose lateral or longitudinal stability.

The trajectory control system 24 may continuously determine the maximum steering curvature that can be safely accomplished by the autonomously controlled vehicle while preserving Vehicle Stability under current environmental, speed and payload conditions.

The mission controller 40 of the Traffic Management System may issue Assignment updates to the autonomously controlled vehicle. The Assignment Modifications can be a change of the current mission speed profile by applying a global factor (i.e. reduce speed by 20%), by re-defining the speed profile for Mission Assignments.

The trajectory control system may validate requested assignment Modifications updates and accept them after determining their feasibility.

Assignments may only be modified with other assignments of the same kind. Mission Assignments may be modified only by other mission assignments. Speed Profile modifications may apply to only to Mission assignments. Global Factor modifications may apply to any assignment.

If the Requested Modification updates are determined to not being feasible by the trajectory control system 24, the trajectory control system 24 may not accept the modifications, notify the mission controller 40 of the Traffic Management System and go to Pause within a predetermined time frame.

Upon acceptance of an assignment update, the trajectory control system 24 may modify its current mission to comply with the modifications within a predetermined time frame and notify the mission controller 40 of the Traffic Management System of its acceptance.

The invention claimed is:

1. A method for autonomously controlling a vehicle performed by a control system of the vehicle on the basis of a mission received from a mission controller, the method comprising:
receiving a mission comprising a set of instructions remotely from the mission controller at the control system of the vehicle;
validating the mission by checking whether the mission meets a first set of requirements, wherein the control system of the vehicle autonomously validates the mission; and then
autonomously executing the mission if the mission meets the first set of requirements and autonomously rejecting the mission if the mission does not meet the first set of requirements,
wherein the step of validating the mission comprises at least one of the sub-steps of:
    validating a lateral vehicle stability during the mission by validating a turning radius and a vehicle velocity in dependence on a weight of the vehicle, and
    storing a 3D terrain map and performing the validating step using the 3D terrain map by determining a terrain slope from the 3D terrain map and validating whether the vehicle stays within an operating envelope based on a vehicle weight and the terrain slope; and
receiving a mission update at the autonomously controlled vehicle comprising a modification of a current mission, validating the mission update, and
    if the mission update does not meet the first set of requirements, reject the modification, notify the mission controller of the rejection and go to pause within a predetermined time frame,
    if the mission update meets the first set of requirements accept the mission update, modify the current mission to comply with the modification within a predetermined time frame and notify the mission controller of the acceptance.

2. The method of claim 1, comprising the further steps of:
during execution of the mission, receiving a mission update from the mission controller comprising a second mission and validating the second mission during execution of the first mission.

3. The method of claim 1, comprising the further steps of:
determining a current value of at least one dynamic variable, the dynamic variable describing at least one out of a vehicle parameter and an environmental parameter and
performing the step of validating the mission using the current value of the at least one dynamic variable.

4. The method of claim 3, wherein the at least one the dynamic variable describes at least one out of a weight of the vehicle, a loading condition, a weather condition and a road condition.

5. The method of claim 1, comprising the further steps of:
storing a mission received from the mission controller,
receiving a command from the mission controller to execute the mission and on receipt of the command to execute the mission, performing the following sub-steps:
    determining a current value of at least one the dynamic variable, the dynamic variable describing at least one out of a vehicle parameter and an environmental parameter and
    performing the step of validating the mission using the current value of the dynamic variable.

6. The method of claim 1, wherein the vehicle comprises an electric retarder and at least one service brake, and wherein the step of validating the mission comprises the sub-step of:

validating whether the mission can be executed using only the electric retarder.

7. The method of claim 1, wherein the operating envelope is at least one out of:
a retarding envelope describing a maximum downhill speed allowed by a retarder of the vehicle, the maximum downhill speed depending on the terrain slope and the vehicle weight;
a gradeability envelope describing a maximum uphill speed of the vehicle, the maximum uphill speed depending on the terrain slope and the vehicle weight; and
a lateral vehicle stability envelope describing a turning radius and a vehicle velocity in dependence on the terrain slope and a weight of the vehicle.

8. The method of claim 1, wherein the vehicle is an autonomously controlled vehicle.

9. The method of claim 1, wherein the first set of requirements comprises a sub requirement that a reference speed and segment distance with respect to requirements of neighboring segments of the mission are within a capability of the vehicle.

10. The method of claim 1, wherein the step of validating the mission comprises at least the following sub-step:
validating whether all segments of the mission have been received and are continuous.

11. The method of claim 1, the method further comprising:
during execution of the first mission, receiving a mission update from the mission controller comprising a second mission and autonomously validating the second mission during execution of the first mission.

12. The method of claim 11, comprising at least one of:
if the second mission passes validation, stopping execution of the first mission and starting execution of the second mission;
if the second mission is rejected during validation, aborting the first mission and stopping the vehicle.

13. The method of claim 11, wherein the second mission is validated with respect to a current pose of the vehicle, the pose comprising a current position, heading and speed of the vehicle.

14. A method for autonomously controlling a vehicle performed by a control system of the vehicle on the basis of a mission received from a mission controller, the method comprising:
receiving a mission comprising a set of instructions remotely from the mission controller at the control system of the vehicle;
validating the mission by checking whether the mission meets a first set of requirements, wherein the control system of the vehicle autonomously validates the mission; and then
autonomously executing the mission if the mission meets the first set of requirements and autonomously rejecting the mission if the mission does not meet the first set of requirements,
wherein the mission comprises a plurality of segments, each segment comprising a segment distance and a reference speed, wherein the step of validating the mission comprises:
validating for each segment whether a reference speed is within a capability of the vehicle with respect to a segment distance;
and
receiving a mission update at the autonomously controlled vehicle comprising a modification of a current mission,
validating the mission update, and
if the mission update does not meet the first set of requirements, reject the modification, notify the mission controller of the rejection and go to pause within a predetermined time frame,
if the mission update meets the first set of requirements accept the mission update, modify the current mission to comply with the modification within a predetermined time frame and notify the mission controller of the acceptance.

15. The method of claim 14, further comprising:
if the speed is outside the capability of the vehicle, adapting the reference speed of the segment or a reference speed of a neighboring segment.

16. A control system for autonomously controlling a vehicle on the basis of a mission received from a mission controller, the control system comprising:
a processor;
a memory that contains instructions that when executed by the processor performs the steps of:
receiving a mission comprising a set of instructions from the mission controller at the control system of the vehicle;
validating the mission by checking whether the mission meets a first set of requirements, wherein the control system of the vehicle autonomously validates the mission; and then
autonomously executing the mission via the vehicle if the mission meets the first set of requirements and autonomously rejecting the mission if the mission does not meet the first set of requirements,
wherein the mission comprises a plurality of segments, each segment comprising a segment distance and a reference speed, and the first set of requirements comprises a sub requirement that, for each segment, the reference speed and segment distance with respect to requirements of neighboring segments of the mission are within a capability of the vehicle;
and
receiving a mission update at the autonomously controlled vehicle comprising a modification of a current mission,
validating the mission update, and
if the mission update does not meet the first set of requirements, reject the modification, notify the mission controller of the rejection and go to pause within a predetermined time frame,
if the mission update meets the first set of requirements accept the mission update, modify the current mission to comply with the modification within a predetermined time frame and notify the mission controller of the acceptance.

17. The control system of claim 16, comprising a mission storage system for storing a plurality of missions received from a mission controller, the control system configured for:
receiving a command from the mission controller to execute the mission and on receipt of the command to execute the mission, performing the following sub-steps:
determining a current value of at least one the dynamic variable, the dynamic variable describing at least one out of a vehicle parameter and an environmental parameter and performing the step of validating the mission using the current value of the dynamic variable.

18. The control system of claim 16, the control system configured for:
 during execution of the mission, validating in real time whether the mission or a segment of the mission meets a second set of requirements.

\* \* \* \* \*